(12) United States Patent
Zerrad et al.

(10) Patent No.: US 10,627,227 B2
(45) Date of Patent: Apr. 21, 2020

(54) OPTICAL DEVICE FOR CHARACTERIZATION OF A SAMPLE

(71) Applicants: CENTRE NATIONAL DE LA RECHERCHE SCIENTIFIQUE, Paris (FR); UNIVERSITÉ D'AIX-MARSEILLE, Marseilles (FR)

(72) Inventors: Myriam Zerrad, Marseilles (FR); Michel Lequime, Gardanne (FR); Claude Amra, Marseilles (FR)

(73) Assignees: Centre National de la Recherche Scientifique, Paris (FR); UNIVERSITÉ D'AIX-MARSEILLE, Marseilles (FR)

( * ) Notice: Subject to any disclaimer, the term of this patent is extended or adjusted under 35 U.S.C. 154(b) by 0 days.

(21) Appl. No.: 16/333,346

(22) PCT Filed: Sep. 16, 2016

(86) PCT No.: PCT/FR2016/052352
§ 371 (c)(1),
(2) Date: Mar. 14, 2019

(87) PCT Pub. No.: WO2018/050972
PCT Pub. Date: Mar. 22, 2018

(65) Prior Publication Data
US 2019/0212274 A1 Jul. 11, 2019

(51) Int. Cl.
*G01B 11/30* (2006.01)
*G01N 21/47* (2006.01)
(Continued)

(52) U.S. Cl.
CPC ......... *G01B 11/30* (2013.01); *G01N 21/4738* (2013.01); *G01N 21/59* (2013.01);
(Continued)

(58) Field of Classification Search
None
See application file for complete search history.

(56) References Cited

U.S. PATENT DOCUMENTS

| 3,336,833 A | 8/1967 | Villers |
| 6,198,531 B1 * | 3/2001 | Myrick ..................... G01J 3/28 356/300 |

(Continued)

FOREIGN PATENT DOCUMENTS

| DE | 3020044 | 12/1981 |
| JP | 2006-17684 | 1/2006 |

(Continued)

OTHER PUBLICATIONS

Zerrad et al., "Spatially Resolved Surface Topography Retrieved from Far-Field Intensity Scattering Measurements," Applied Optics, vol. 53, No. 4, pp. A297-A304 (2014).
(Continued)

*Primary Examiner* — Michelle M Iacoletti
(74) *Attorney, Agent, or Firm* — Occhiuti & Rohlicek LLP

(57) ABSTRACT

The invention relates to an optical device for characterization of a sample (3) comprising —a source (5) of parallel or collimated light, having an emission spectrum that is continuous over an observation wavelength range of at least 50 nm width, for illuminating the sample (3), —a detector (7) of light scattered by the sample (3), operating in said observation wavelength range, —a filter (9) for specific spectral weighting arranged on an optical path upstream of the detector (7) of the scattered light, and —a processing unit (11) for processing the measurement signal in order to extract a characterization parameter of the sample (3).

17 Claims, 7 Drawing Sheets

Figure 1:
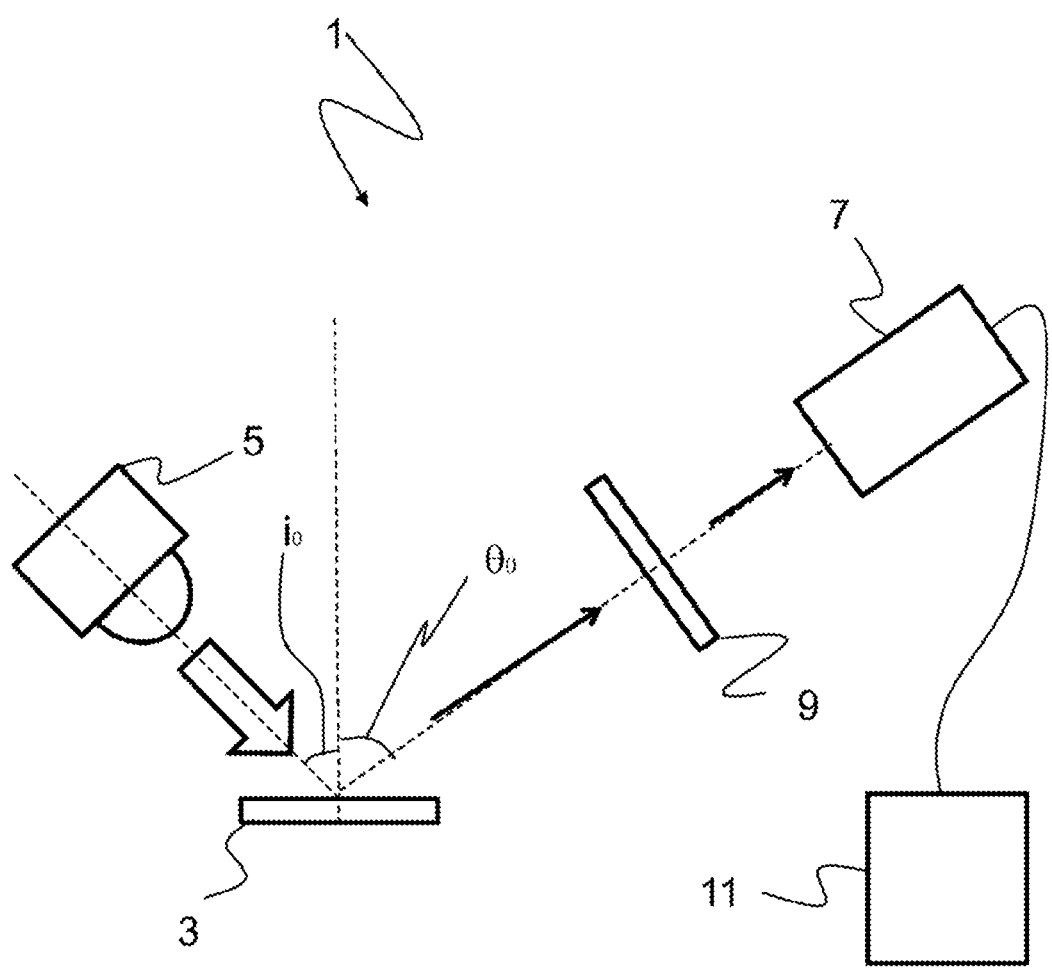

(51) Int. Cl.
*G01N 21/59* (2006.01)
*G01N 21/88* (2006.01)
*G02B 5/28* (2006.01)
*G01N 21/85* (2006.01)

(52) U.S. Cl.
CPC ......... *G01N 21/85* (2013.01); *G01N 21/8806* (2013.01); *G02B 5/285* (2013.01)

(56) References Cited

U.S. PATENT DOCUMENTS

2008/0088854 A1    4/2008  Marie Kiers et al.
2010/0265509 A1*  10/2010  Jones .................... E21B 47/102
                                                                            356/445
2016/0153914 A1    6/2016  Lange

FOREIGN PATENT DOCUMENTS

WO    WO 97/20192       6/1997
WO    WO 2006/063094    6/2006
WO    WO 2006/069443    7/2006

OTHER PUBLICATIONS

De Groot, Peter and Leslie Deck, "Surface Profiling Analysis of White-Light Interferograms in the Spatial Frequency Domain," Journal of Modern Optics, vol. 42, No. 2. pp. 389-401 (1995).
Duparré et al., "Surface Characterization Techniques for Determining the Root-Mean-Square Roughness and Power Spectral Densities of Optical Components", Applied Optics, vol. 41, No. 1, pp. 154-171 (2002).
Gaëtan Le Goïc and Serge Samper, Système de détection d'anomalies d'aspect par la technique PTM, 46 pages (2011).
C. Amra et al. "Multiwavelength (0.45-10.6 µm) Angle-Resolved Scatterometer or How to Extend the Optical Window," Applied Optics, vol. 32, Issue 28, pp. 5462-5474 (1993).
Kuwamura, Susumu and Ichirou Yamaguchi, "Wavelength Scanning Profilometry for Real-Time Surface Shape Measurement," Applied Optics, vol. 36, Issue 19, pp. 4473-4482 (1997).

* cited by examiner

| N° | Thickness | Optical thickness | ABBR | Material |
|----|-----------|-------------------|------|----------|
| 1  | 20.868    | 42.602            | H    | Ta2O5    |
| 2  | 44.387    | 66.005            | B    | SiO2     |
| 3  | 38.54     | 78.678            | H    | Ta2O5    |
| 4  | 34.554    | 51.385            | B    | SiO2     |
| 5  | 68.497    | 139.833           | H    | Ta2O5    |
| 6  | 186.127   | 276.783           | B    | SiO2     |
| 7  | 7.112     | 14.518            | H    | Ta2O5    |
| 8  | 79.161    | 117.717           | B    | SiO2     |
| 9  | 206.775   | 422.12            | H    | Ta2O5    |
| 10 | 11.755    | 17.48             | B    | SiO2     |
| 11 | 121.234   | 247.493           | H    | Ta2O5    |
| 12 | 58.297    | 86.691            | B    | SiO2     |
| 13 | 37.73     | 77.024            | H    | Ta2O5    |
| 14 | 142.081   | 211.283           | B    | SiO2     |
| 15 | 74.081    | 151.233           | H    | Ta2O5    |
| 16 | 38.177    | 56.771            | B    | SiO2     |
| 17 | 47.738    | 97.454            | H    | Ta2O5    |
| 18 | 169.301   | 251.761           | B    | SiO2     |
| 19 | 17.568    | 35.865            | H    | Ta2O5    |
| 20 | 113.346   | 168.553           | B    | SiO2     |

| N° | Thickness | Optical thickness | ABBR | Material |
|----|-----------|-------------------|------|----------|
| 21 | 85.726    | 175.006           | H    | Ta2O5    |
| 22 | 58.696    | 87.285            | B    | SiO2     |
| 23 | 78.971    | 161.215           | H    | Ta2O5    |
| 24 | 245.923   | 365.701           | B    | SiO2     |
| 25 | 40.747    | 83.182            | H    | Ta2O5    |
| 26 | 45.924    | 68.291            | B    | SiO2     |
| 27 | 111.169   | 226.946           | H    | Ta2O5    |
| 28 | 105.9     | 157.48            | B    | SiO2     |
| 29 | 68.79     | 140.432           | H    | Ta2O5    |
| 30 | 84.752    | 126.031           | B    | SiO2     |
| 31 | 277.914   | 567.349           | H    | Ta2O5    |
| 32 | 208.439   | 309.961           | B    | SiO2     |
| 33 | 37.964    | 77.502            | H    | Ta2O5    |
| 34 | 119.294   | 177.397           | B    | SiO2     |
| 35 | 115.656   | 236.107           | H    | Ta2O5    |
| 36 | 38.006    | 56.517            | B    | SiO2     |
| 37 | 108.914   | 222.343           | H    | Ta2O5    |
| 38 | 56.954    | 84.694            | B    | SiO2     |
| 39 | 143.991   | 293.95            | H    | Ta2O5    |
| 40 | 96.722    | 143.831           | B    | SiO2     |

FIG. 5-1

| N° | Thickness | Optical thickness | ABBR | Material |
|---|---|---|---|---|
| 41 | 40.816 | 83.324 | H | Ta2O5 |
| 42 | 120.18 | 178.714 | B | SiO2 |
| 43 | 80.964 | 165.283 | H | Ta2O5 |
| 44 | 146.355 | 217.639 | B | SiO2 |
| 45 | 75.812 | 154.766 | H | Ta2O5 |
| 46 | 82.037 | 121.993 | B | SiO2 |
| 47 | 42.47 | 86.701 | H | Ta2O5 |
| 48 | 201.865 | 300.185 | B | SiO2 |
| 49 | 26.402 | 53.898 | H | Ta2O5 |
| 50 | 71.747 | 106.692 | B | SiO2 |
| 51 | 61.766 | 126.092 | H | Ta2O5 |
| 52 | 135.155 | 200.984 | B | SiO2 |
| 53 | 85.526 | 174.597 | H | Ta2O5 |
| 54 | 78.046 | 116.059 | B | SiO2 |
| 55 | 112.16 | 228.969 | H | Ta2O5 |
| 56 | 115.818 | 172.228 | B | SiO2 |
| 57 | 160.26 | 327.164 | H | Ta2O5 |
| 58 | 84.587 | 125.786 | B | SiO2 |
| 59 | 37.158 | 75.857 | H | Ta2O5 |
| 60 | 130.709 | 194.372 | B | SiO2 |

| N° | Thickness | Optical thickness | ABBR | Material |
|---|---|---|---|---|
| 61 | 39.223 | 80.073 | H | Ta2O5 |
| 62 | 19.335 | 28.752 | B | SiO2 |
| 63 | 72.647 | 148.305 | H | Ta2O5 |
| 64 | 181.05 | 269.232 | B | SiO2 |
| 65 | 116.634 | 238.103 | H | Ta2O5 |
| 66 | 75.861 | 112.81 | B | SiO2 |
| 67 | 72.587 | 148.184 | H | Ta2O5 |
| 68 | 85.371 | 126.952 | B | SiO2 |
| 69 | 157.763 | 322.065 | H | Ta2O5 |
| 70 | 22.46 | 33.399 | B | SiO2 |
| 71 | 203.181 | 414.785 | H | Ta2O5 |
| 72 | 82.078 | 122.055 | B | SiO2 |
| 73 | 219.693 | 448.493 | H | Ta2O5 |
| 74 | 21.041 | 31.29 | B | SiO2 |
| 75 | 65.741 | 134.207 | H | Ta2O5 |
| 76 | 16.589 | 24.669 | B | SiO2 |
| 77 | 202.279 | 412.944 | H | Ta2O5 |
| 78 | 33.029 | 49.116 | B | SiO2 |
| 79 | 11.799 | 24.087 | H | Ta2O5 |
| 80 | 189.062 | 281.147 | B | SiO2 |

FIG. 5-2

| N° | Thickness | Optical thickness | ABBR | Material |
|---|---|---|---|---|
| 81 | 57.915 | 118.23 | H | Ta2O5 |
| 82 | 162.809 | 242.107 | B | SiO2 |
| 83 | 133.099 | 271.716 | H | Ta2O5 |
| 84 | 203.572 | 302.724 | B | SiO2 |
| 85 | 26.33 | 53.751 | H | Ta2O5 |
| 86 | 182.189 | 270.926 | B | SiO2 |
| 87 | 31.952 | 65.229 | H | Ta2O5 |
| 88 | 219.861 | 326.946 | B | SiO2 |
| 89 | 125.078 | 255.34 | H | Ta2O5 |
| 90 | 172.846 | 257.032 | B | SiO2 |
| 91 | 121.898 | 248.849 | H | Ta2O5 |
| 92 | 12.574 | 18.699 | B | SiO2 |
| 93 | 16.008 | 32.679 | H | Ta2O5 |
| 94 | 323.095 | 480.462 | B | SiO2 |
| 95 | 22.02 | 44.953 | H | Ta2O5 |
| 96 | 25.774 | 38.327 | B | SiO2 |
| 97 | 101.655 | 207.524 | H | Ta2O5 |
| 98 | 86.079 | 128.004 | B | SiO2 |

FIG. 5-3

OPTICAL DEVICE FOR CHARACTERIZATION OF A SAMPLE

RELATED APPLICATIONS

This application is the national stage of PCT/FR2016/052352, which was filed on Sep. 16, 2016, the contents of which are herein incorporated by reference.

FIELD OF THE INVENTION

The present invention relates to an optical device for characterizing a sample or an object. Such a characterization may for example result in the determination of a surface finish, in particular a roughness parameter, in particular for a nondestructive analysis of a surface, a polished surface for example.

Such a characterization may also result in the characterization of a volume finish of an object, for example with a view to determining a nonuniformity parameter.

Such optical characterizing devices for example allow the surface finish of polished parts to be examined, in particular in the context of conformity detection and of inspection of the roughness thereof. Thus, a privileged field of application of the invention is quality control on lines for mass-producing parts or manufacturing parts in high number when a high-quality surface finish is needed and requires the quality of such parts to be checked via an analysis of their surface finish, and therefore in particular via an analysis of roughness resulting from defects in the polishing of polished mechanical parts.

The characterization of a surface is also important for example when calibrating polishing processes, which are also indispensable if losses due to scattering of light in optical components (multilayers, gratings, photonic crystals, etc.) is to be limited. Given the increasing importance of optronics in industry (in particular telecommunications, measurement methods or the construction of computers based on optronic components) it will be understood that reliable optical characterizing devices that allow a surface finish of an object to be rapidly measured are required.

Nonlimitingly, a similar strategic imperative is moreover evident in the field of fabrics or even the biomedical field (characterization of the skin for example), the textile field the paper-making industry, the security industry, the microelectronics industry or even the cosmetics industry.

BACKGROUND AND PRIOR ART

In the prior art, use of a stylus-based roughness tester to determine the roughness of a surface is known.

However, this type of test takes a relatively long time to carry out, because the roughness must be measured, using a contact technique, segment by segment.

In addition, because of the size of styluses, it is not possible to detect defects of less than a certain size and the smaller the defects to be detected, the longer the measurements take.

It is also known to use other techniques such as electron, optical or near-field microscopy, and techniques based on the scatter of light in the far field.

These techniques allow a rapid inspection of surface finishes, which may be carried out in a short amount of time.

Among these techniques, those based on the scatter of light in the far field in particular seem to be advantageous, because they are nonintrusive and because they allow the consequences of scattering effects governed by the wave theory of light to be used to extract, almost instantaneously, derived properties of the surface of the examined part, allowing irregularities such as small scratches or local roughness that would be completely invisible to the naked eye to be detected.

To do this, the light that an object/sample to be observed scatters in every direction of space, in reflection or transmission, is first measured, for example using an integrating sphere to take a single measurement of the integrated total scattering in every direction of space.

However, such characterization proves to be unsatisfactory, in particular because it does not take into account the notion of passband or spatial resolution.

To overcome this difficulty, measuring techniques have been developed that measure the scattered light emitted by the sample in each direction of space. Angular resolved scattering (ARS) then being spoken of.

However, to obtain a precise result, a scan of scattering angle must be performed, this requiring a precise mechanical mechanism for moving the detector of scattered light; not only are such systems complex and expensive but also the process of analysis is once again quite slow.

Lastly, an integrating hemisphere equipped at its apex with a sensor for measuring scattered light and with several tens of light sources that are distributed over the hemisphere and that allow the object/sample to be analyzed to be illuminated from various angles is known.

In this case, each light source is turned on in turn and an image of the light scattered by each of the light sources is taken. Therefore, as many images of scattered light as there are light sources fastened to the hemisphere are obtained. Although this method is very precise, it requires a very large volume of data to be dealt with, this making it too slow for certain industrial processes.

INVENTION SUMMARY

The present invention aims to at least partially mitigate the drawbacks of the devices of the prior art by providing a device allowing a sample or an object to be characterized optically (for example its surface finish or volume nonuniformity) via one image captured in a single direction.

To this end, the invention provides an optical device for characterizing a sample comprising
- a source of parallel or collimated light, having a continuous emission spectrum in an observation wavelength range of at least 50 nm width, for illuminating said sample,
- a detector of light scattered by the sample, functioning in said observation wavelength range,
- a spectral weighting filter placed on the optical path upstream of the detector of scattered light, and
- a unit for processing the measurement signal in order to extract a parameter characterizing the sample, wherein the spectral weighting filter possesses, in said observation wavelength range, in reflection or transmission, a spectral filtering function $T(\lambda)$ given by the following equation:

$$T(\lambda) = \eta / [\lambda^3 \Psi(i_0, \theta_0, \lambda) F(\lambda) K(\lambda)]$$

where
- $\eta$ is a constant of proportionality,
- $\lambda$ is wavelength,
- $\theta_0$ is the direction of scatter or of observation of the light,
- $i_0$ is the angle of incidence at which the sample is illuminated by the light source, F(λ) is the spectral power density of the source in the observation wavelength range, K(λ) is the spectral response of the detector in the observation wavelength range, $\Psi(i_0,\theta_0,\lambda)=C(i_0,\theta_0,\lambda)$ in case of characterization of a surface of the sample and $\Psi(i_0,\theta_0,\lambda)=D(i_0,\theta_0,\lambda)$ in case of characterization of a volume of the sample, $C(i_0,\theta_0,\lambda)$ is an optical coefficient given by perturbation theories of the scatter of light by a rough surface, and $D(i_0,\theta_0,\lambda)$ is an optical coefficient this time given by perturbation theories of the scatter of light by non-uniform volumes.

The optical characterizing device according to the invention is noteworthy for the rapidity of the measurements, its compactness and its simplicity. Specifically, this optical characterizing device functions via a single measurement in a single direction of illumination or of scatter. No scan, neither in wavelength nor spatial or angular is required.

The weighting filter thus makes it possible to make it so that the measurement of scatter in a single direction and under white light is, in the surface-characterizing mode, proportional to the roughness of the illuminated surface and, in the volume-characterizing mode, proportional to the non-uniformity of the medium from which the sample or object is composed.

This is very advantageous in particular when it is desired to characterize samples that are difficult or even impossible to access and/or manipulate, or when these samples can be illuminated or measured only in certain particular directions.

These observations apply both to objects or samples to be characterized in the laboratory or center of studies, but also to long-distance characterization such as may be the case with satellites or other on-board systems.

The detecting device according to the invention may have one or more of the following features, which may be implemented alone or in combination:

According to one aspect, the light source may be chosen from the following group: an incandescent lamp, a white-light laser, a white-light diode or a non-filtered supercontinuum laser.

According to another aspect, the detector of scattered light comprises a CCD sensor or a CMOS sensor.

The spectral weighting filter is for example placed between the sample and the detector of scattered light, or indeed between the light source and the sample.

The weighting filter for example comprises a stack of thin films.

The stack of thin films may be deposited using technologies for depositing semiconductor films or thin optical films.

The stack of thin films for example comprises at least one first material having a first refractive index and one second material having a second refractive index that is different from the first refractive index, said materials being placed in alternation.

According to one example embodiment, the difference between the first and second refractive index is larger than 0.4.

The films possess, by way of example, a thickness smaller than 350 nm and in particular comprised between 20 nm and 325 nm. More generally, the thickness of the films has the order of magnitude a fraction of the average wavelength of the light source.

According to one particular embodiment, the first material is silica and the second material is tantalum oxide.

More generally, the filters may be produced with any number of dielectrics, such as oxides, nitrides, sulfides, etc., and may even include thin metal or semiconductor films.

According to yet another aspect, in the presence of the spectral weighting filter configured for surface scattering, the processing unit is programmed to extract the roughness δ of the surface of the sample using the following formula:

$$\delta^2=[v(\theta_0)/\eta\Delta\Omega][2\pi(n_0\sin\theta_0)^2]$$

where $\theta_0$ is the angle of the detection direction, $n_0$ is the optical refractive index of the medium in which the measurement is carried out (in general air, so $n_0\approx 1$), $\Delta\Omega$ is the measurement solid angle of the detection, $\eta$ is the constant of proportionality precedingly associated with the weighting filter, and $v(\theta_0)$ is the signal delivered by the detector of scatter in the direction $\theta_0$ when the sample is illuminated with the light source.

According to yet another aspect, in the presence of a spectral weighting filter configured for volume scattering, the processing unit is programmed to extract a normalized standard deviation of the nonuniformity (Δn/n) of the volume of the sample using the following formula $$(\Delta n/n)^2=(1/4)[v(\theta_0)/\eta\Delta\Omega][2\pi(n_0\sin\theta_0)^2]$$

where $\theta_0$ is the angle of the detection direction, $n_0$ is the optical refractive index of the medium in which the measurement is carried out (in general air, so $n_0\approx 1$), $\Delta\Omega$ is the measurement solid angle of the detection, and $\eta$ is the constant of proportionality precedingly associated with the weighting filter.

In this case, $v(\theta_0)$ is the signal delivered by the detector of scatter in the direction $\theta_0$ when the sample is illuminated with the light source.

Furthermore, the measurement $v(\theta_0)$ is this time a measurement of volume scattering of light.

The invention also relates to a method for characterizing a sample comprising the following steps:

a sample is illuminated with a source of parallel or collimated light having a continuous emission spectrum in an observation wavelength range of at least 50 nm width, light scattered by the sample is detected, a spectral filter for weighting the light source being placed on the optical path upstream of the detector of scattered light, and a parameter characterizing the sample is extracted, wherein that the spectral weighting filter possesses, in said observation wavelength range, in reflection or transmission, a spectral filtering function T(λ) given by the following equation:

$$T(\lambda)=\eta/[\lambda^3\Psi(i_0,\theta_0,\lambda)F(\lambda)K(\lambda)]$$

where $\eta$ is a constant of proportionality,

λ is wavelength, $\theta_0$ is the direction of scatter of the light, $i_0$ is the angle of incidence at which the sample is illuminated by the light source, F(λ) is the spectral power density of the source in the observation wavelength range, K(λ) is the spectral response of the detector in the observation wavelength range, $\Psi(i_0,\theta_0,\lambda)=C(i_0,\theta_0,\lambda)$ in case of characterization of a surface of the sample and $\Psi(i_0,\theta_0,\lambda)=D(i_0,\theta_0,\lambda)$ in case of characterization of a volume of the sample, C($i_0,\theta_0,\lambda$) is an optical coefficient given by perturbation theories of the scatter of light by a rough surface, and
D($i_0,\theta_0,\lambda$) is an optical coefficient this time given by perturbation theories of the scatter of light by non-uniform volumes.

The method according to the invention may have one or more of the following features, which may be implemented alone or in combination:

According to one aspect, in the presence of the weighting filter configured for surface scattering, the roughness $\delta$ of the surface of the sample is extracted using the following formula:

$$\delta^2 = [v(\theta_0)/\eta\Delta\Omega][2\pi(n_0 \sin\theta_0)^2]$$

where
$\theta_0$ is the angle of the detection direction,
$n_0$ is the optical refractive index of the medium in which the measurement is carried out (in general air, so $n_0 \approx 1$),
$\Delta\Omega$ is the measurement solid angle of the detection,
$\eta$ is the constant of proportionality precedingly associated with the weighting filter, and
$v(\theta_0)$ is the signal delivered by the detector of scatter in the direction $\theta_0$ when the sample is illuminated with the light source.

According to yet another aspect, in the presence of a spectral weighting filter configured for volume scattering, a normalized standard deviation of the nonuniformity ($\Delta n/n$) of the volume of the sample is extracted using the following formula:

$$(\Delta n/n)^2 = (1/4)[v(\theta_0)/\eta\Delta\Omega][2\pi(n_0 \sin\theta_0)^2]$$

where
$\theta_0$ is the angle of the detection direction,
$n_0$ is the optical refractive index of the medium in which the measurement is carried out (in general air, so $n_0 \approx 1$),
$\Delta\Omega$ is the measurement solid angle of the detection,
$\eta$ is the constant of proportionality precedingly associated with the weighting filter, and
$v(\theta_0)$ is the signal delivered by the detector of scatter in the direction $\theta_0$ when the sample is illuminated with the light source.

BRIEF DESCRIPTIONS OF THE DRAWINGS

Figure 2:
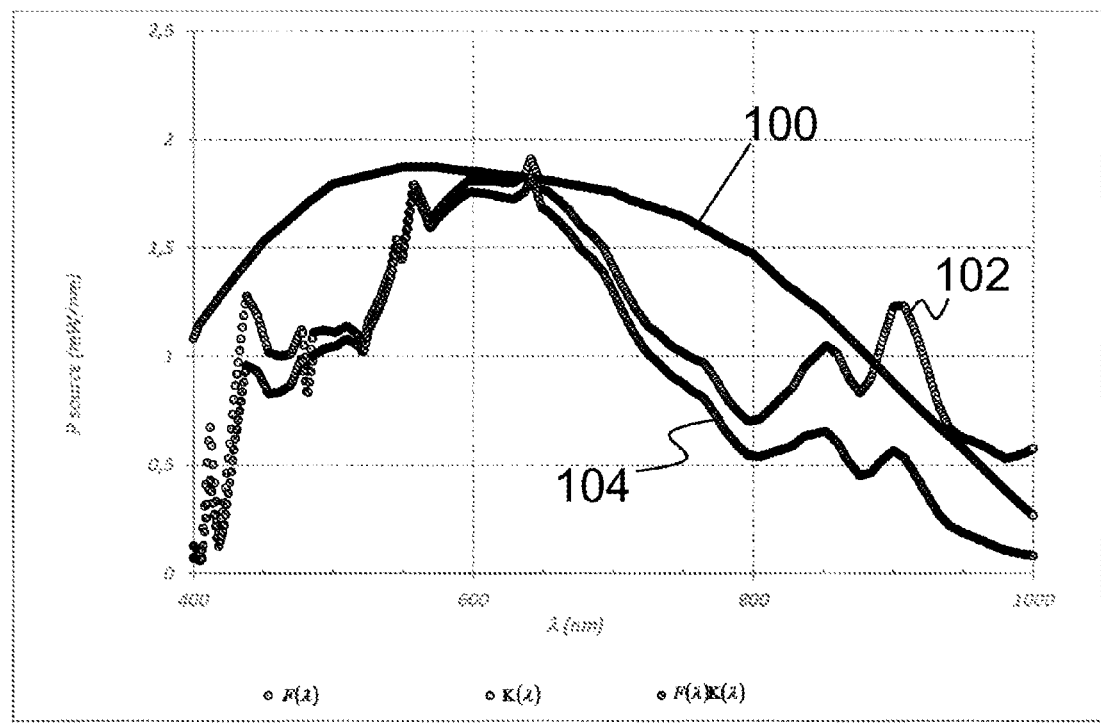
Figure 3:
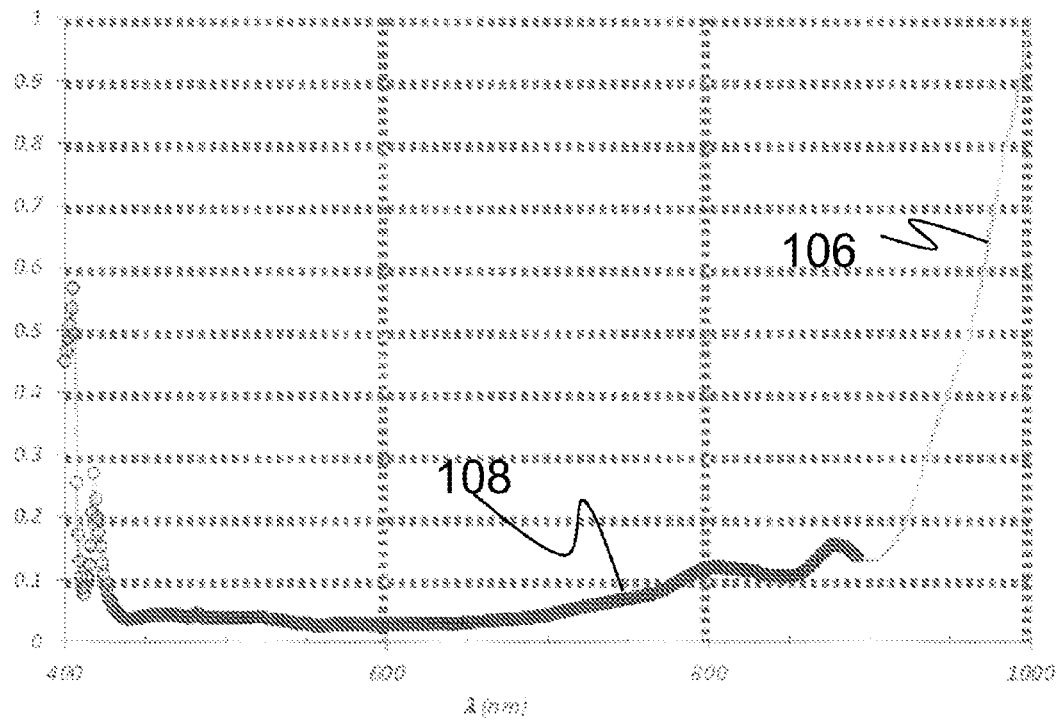
Figure 4:
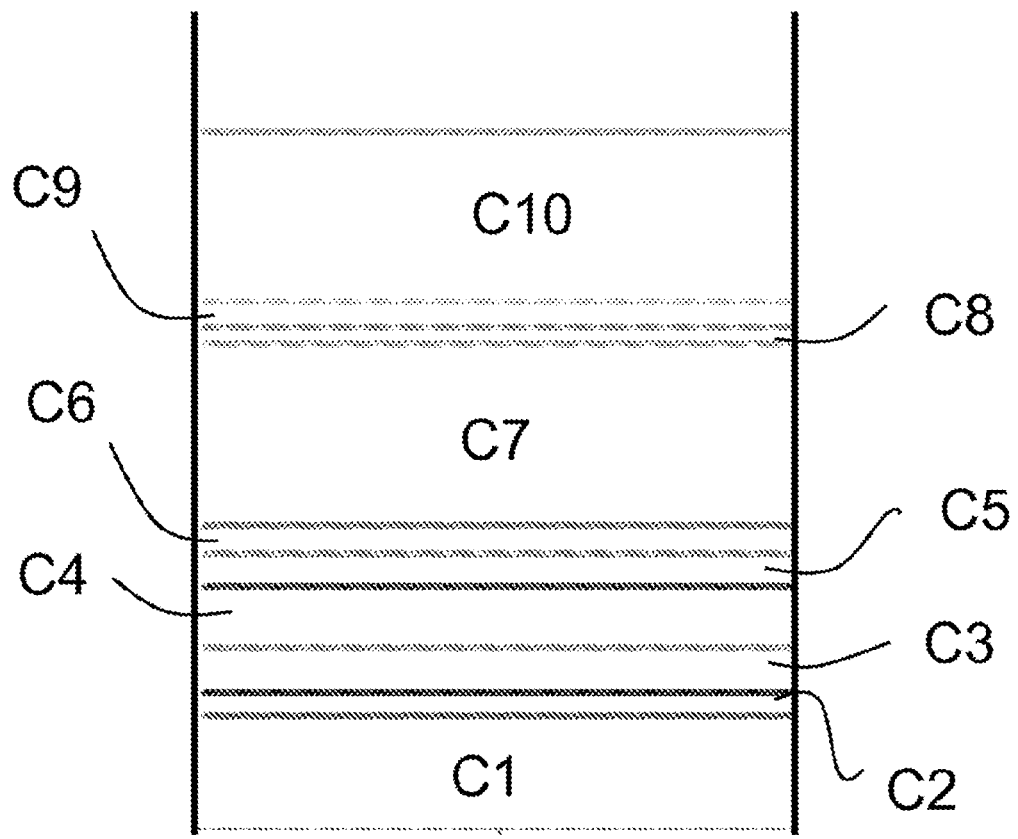
Figure 6:
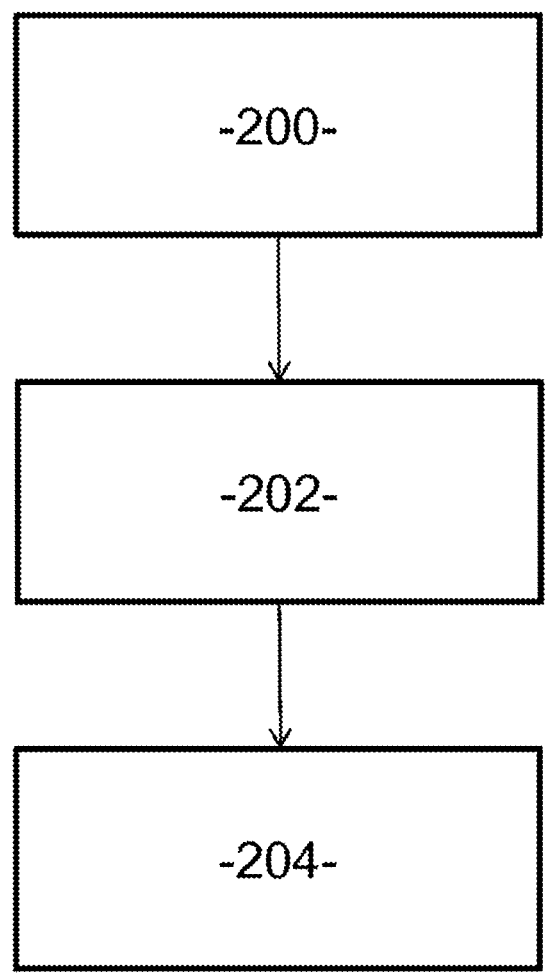

Other advantages and features will become apparent on reading the description of the invention, and from the following figures, in which:

FIG. 1 shows a schematic of a detecting device according to the invention,

FIG. 2 shows a graph as a function of wavelength of the spectral variations of an example of a light source and the spectral variations of a detector of scattered light and the product thereof, FIG. 3 shows a graph as a function of wavelength of the spectral variation in a weighting function, FIG. 4 shows an example of a weighting filter for the illuminating and detecting device of FIG. 1, FIG. 5 (which is composed of FIGS. 5-1, 5-2 and 5-3) reproduces in a table the structural features of one embodiment of a weighting filter, and FIG. 6 shows the various steps of the method according to the invention.

DETAILED DESCRIPTION

In the figures, elements that are the same have been referenced with the same references.

The following embodiments are given by way of nonlimiting example. Although the description refers to one or more embodiments, this does not necessarily mean that each reference relates to the same embodiment, or that the features apply to only one single embodiment. Single features of various embodiments may also be combined to create other embodiments.

In the description, certain elements or parameters may be indexed, such as for example first element or second element and first parameter and second parameter or even first criterion and second criterion, etc. In this case, it is a question of simple indexation to differentiate and denote elements or parameters or criteria that are similar but not identical. This indexation does not imply a priority of one element, parameter or criterion with respect to another and such denominations may easily be interchanged without departing from the scope of the present description.

In the present description, by "spectral weighting filter", what is meant is an optical device that modifies the spectral distribution of incident radiation, such as for example an interference filter, micro-mirrors or spectrometers.

FIG. 1 schematically shows one example embodiment of an optical device 1 for characterizing a sample 3 or an object.

The words sample and object (object of study) are here used as synonyms. The sample may be planar or have a certain shape.

The object or sample may for example be a glass, metal or semiconductor substrate. It may also be an organic substrate, or even a plant or biological tissue. These objects or samples may be related to optical, mechanical, textile or paper-making applications.

The objects may also be liquid or gaseous.

This optical device 1 for characterizing a sample 3 comprises, for illuminating the sample 3, a source 5 of parallel light having a continuous emission spectrum in an observation wavelength range of at least 50 nm, in particular 100 nm or even in all the visible spectrum between 400 nm and 750 nm and/or a portion of the IR spectrum.

More generally, the spectrum of the source must be extensive, in contrast to the spectrum of a monochromatic laser. Therefore, the source will be said to be "white", and it will possibly also consist of any "broad" spectrum source, including white lasers or diodes, etc.

By default, the adjective "broad" will possibly be considered to mean that the spectral width is comprised between 50 nm and 1000 nm, it being understood that the performance of the instrument will improve with this spectral width. It will here be noted that the spectral width of the source, associated with the measurement directions, will set the spatial resolution and the frequency window for the roughness measurement.

Typically, the illuminated size of the sample 3 may be comprised between 1 mm$^2$ and 4 cm$^2$.

Of course, in the case of surface characterization to obtain a roughness $\delta$, the sample 3 must have a good average planarity.

Specifically, for example for a substrate, the planarity must be such that the angle of incidence of local illumination must not vary by more than a few degrees.

The field of application in terms of surface roughness or volume nonuniformity is defined by that of perturbation theories (this will be explained below); this means that the scattering must remain small with respect to the incident flux, or even that the roughness must remain small with respect to the wavelength of the radiation.

In the case of volume scattering, the nonuniformity must be small with respect to 1.

When these conditions are not met, measurement precision is lost.

Thus, optical surfaces (polished surfaces, or surfaces generating a small amount of scattered flux) lie fully within the field of application of the present invention, as do weakly nonuniform volumes.

By way of example, the light source 5 of continuous emission spectrum for example comprises an incandescent lamp, a white-light laser, a white-light diode or indeed a non-filtered supercontinuum laser.

The light source 5 may be continuous-wave or pulsed. In the case of a pulsed light source 5, the calculations are carried out differently in order to take into account the pulsed aspect of the source, and temporal analysis of the scattered signal then returns the roughness or nonuniformity values, by virtue of a time/frequency analogy.

The optical characterizing device 1 in addition comprises a detector 7 of the light scattered by the sample, such as for example a CCD sensor or a CMOS sensor (such as found in a video camera). Of course, other optical detectors, such as for example a photomultiplier, may be used provided that they are suitable for detecting the scattered light.

As may be seen in FIG. 1, the light source 5 emits along an axis having an angle of incidence $i_0$ of illumination with respect to the perpendicular to the surface of the sample 3 and the detector 7 detects light scattered at an observation angle $\theta_0$.

The variation in the angle of incidence of illumination has the effect of moving the passband of the measurement without decreasing the validity of the method.

It will be recalled that the spatial-frequency passband lies between the values $n_0|\sin(\theta_0)-\sin(i_0)|/\lambda_2$ and $n_0|\sin(\theta_0)-\sin(i_0)|/\lambda_1$, where $\lambda_1$ and $\lambda_2$ are the minimum and maximum wavelengths of the observation wavelength range of the source. Generally, the roughness measurement remains fully valid in so far as the passband is specified.

A spectral filter 9 for weighting the light emitted by the source 5 is placed on the optical path upstream of the detector 7 of scattered light, and more specifically between the sample 3 and the detector 7. Of course, this spectral weighting filter 9 may also be placed between the light source 5 and the sample 3.

The weighting filter 9 possesses, in said observation wavelength range, in reflection or transmission, a spectral filtering function $T(\lambda)$ given by the following equation:

$$T(\lambda) = \eta/[\lambda^3 \Psi(i_0, \theta_0, \lambda) F(\lambda) K(\lambda)] \quad \text{(eq. 1)}$$

where $\eta$ is a constant of proportionality, $\lambda$ is wavelength, $\theta_0$ is the direction of scatter of the light, $i_0$ is the angle of incidence at which the sample is illuminated by the light source, $F(\lambda)$ is the spectral power density of the source in the observation wavelength range, $K(\lambda)$ is the spectral response of the detector in the observation wavelength range, $\Psi(i_0, \theta_0, \lambda) = C(i_0, \theta_0, \lambda)$ in case of characterization of a surface of the sample and $\Psi(i_0, \theta_0, \lambda) = D(i_0, \theta_0, \lambda)$ in case of characterization of a volume of the sample (3), $C(i_0, \theta_0, \lambda)$ is an optical coefficient given by perturbation theories of the scatter of light by a rough surface, and $D(i_0, \theta_0, \lambda)$ is an optical coefficient this time given by perturbation theories of scatter by nonuniform volumes.

The spectral weighting filter 9 therefore possesses, in reflection or transmission, a spectral filtering function $T(\lambda)$ that is proportional to the inverse of the quantity given by the cube of the wavelength $\lambda$ multiplied by the product of three terms that are the spectral response $K(\lambda)$ of the detector, the spectral power density $F(\lambda)$ of the source and an optical coefficient $\Psi(i_0, \theta_0, \lambda)$.

$\Psi(i_0, \theta_0, \lambda) = C(i_0, \theta_0, \lambda)$ in case of characterization of a surface of the sample and $C(i_0, \theta_0, \lambda)$ is given by perturbation theories of scattering by a rough surface (ref: Claude Amra, C. Grèzes-Besset, and L. Bruel, "Comparison of surface and bulk scattering in optical multilayers", Appl. Opt. 32, 5492-5503 (1993)).

$\Psi(i_0, \theta_0, \lambda) = D(i_0, \theta_0, \lambda)$ in case of characterization of a volume of the sample, and $D(i_0, \theta_0, \lambda)$ is given by perturbation theories of scattering by volumes (ref: Claude Amra, C. Grèzes-Besset, and L. Bruel, "Comparison of surface and bulk scattering in optical multilayers", Appl. Opt. 32, 5492-5503 (1993)).

It will be noted here that an approximate formula may be used for this filter in the case of surface scattering, assuming that the coefficient $C(i_0, \lambda)$ does not depend on the direction of scatter; in this case, the filter becomes proportional to the ratio $\lambda/(FK)$.

The detector 7 of scattered light is connected to a unit 11 for processing the measurement signal in order to extract the roughness of the surface or the nonuniformity of the sample 3, as will be described in more detail below.

As will be clear from the above equation (eq. 1), the spectral weighting filter is manufactured specifically for one light source 5 and one detector 7 of scattered light.

Specifically, equation (1) takes into account the spectral power density $F(\lambda)$ of the light source 5 in the observation range and the spectral response $K(\lambda)$ of the detector 7 in the observation wavelength range.

FIG. 2 shows a graph as a function of wavelength $\lambda$ of the relative spectral variations $F(\lambda)$ of an example of a light source (curve 100) and those $K(\lambda)$ of a detector (curve 102) of scattered light and the product thereof $F(\lambda)*K(\lambda)$ (curve 104).

These data may generally be obtained from the datasheets of manufacturers of optical equipment.

In the example of FIG. 2, the light source 5 is a supercontinuum laser and the detector 7 is a CCD sensor.

On the basis of these data, it is possible, by virtue of equation 1, to define a theoretical curve of reflectance or transmittance $T(\lambda)$, which is drawn in FIG. 3 (curve 106) with a thin line for all the domain 400 nm-1000 nm.

On the basis of such a theoretical curve, it is possible to design by calculation a spectral weighting filter 9 formed for example of a stack of thin planar films. Synthesis techniques for performing this calculation are well-known (reference: H. A. Macleod, A. MacLeod, Thin Film Optical Filters, ISBN-13:9780750306881, 3rd edition, January 2001, Taylor and Francis, Inc.).

An example of the ten first films of a spectral weighting filter 9 is shown in FIG. 4, the entirety of the features of an example weighting filter of 98 films being reproduced in FIG. 5 (composed of FIGS. 5-1, 5-2 and 5-3) in the form of a table detailing, in the first column, an order No. "#" of the films ($C_j$, $j$ being an integer number), in the second column, physical thickness, in the third column, optical thickness, in the fourth column, the letter "H" designates a material of high refractive index and the letter "B" a low refractive index, and, in the fifth column, the material from which the film in question of No. "#" is made (in the present case $Ta_2O_5$ and $SiO_2$), the weighting filter being passed through by light scattered from the last film (No. 98) toward the first film. It will however be noted that for these linear and nonabsorbent filters, the transmittance does not depend on the direction of propagation of the light.

This spectral weighting filter 9 is formed from a stack of thin planar and parallel films, in the present example the ten first of which are referenced $C_{10}$-$C_{10}$ in FIG. 4.

With regard to the manufacture of such a thin-film filter, the reader may for example refer to [P. W. Baumeister, Optical Coating Technology, ISBN: 9780819453136, SPIE Press Book (2004)]. The films C, are for example deposited one after the other using thin-film deposition technology such as physical vapor deposition (PVD). Of course, other technologies specific to thin optical films such as for example evaporation or ion-assisted evaporation, ion-beam sputtering, magnetron sputtering and sol-gel processing are envisionable.

In the present case, the stack of thin films comprises at least one first material having a first so-called low refractive index (letter "B" in the table of FIG. 5), silica for example (average refractive index in the visible $n_{SiO2} \approx 1.487$) and a second so-called high index material (letter "H" in the table of FIG. 5), tantalum oxide for example (refractive index varying approximately about $n_{Ti2O5} \approx 2.15$ in the visible), the refractive index of which is different from the first refractive index, said materials being placed in alternation one above the other.

The difference between the first and second refractive index is in particular larger than or equal to 0.4, and here even larger than 0.5, and the films possess a thickness smaller than 350 nm, and in particular comprised between 20 nm and 325 nm. The larger the difference between the first and second refractive index, the smaller the number of films.

In the case where the index difference is small, by increasing the number of thin films, it is possible to obtain similar performance levels. However, it will be understood that the cost of a weighting filter 9 depends on the number of films that make it up.

Therefore, it is desirable for the refractive index difference to be as large as possible in order to be able to decrease the number of films. Having said that, techniques for synthesizing multilayer stacks sometimes require many films of materials of little-different indices to be used, in particular to remove or decrease potential oscillations in the spectral profile.

Moreover, the order of magnitude of the thicknesses is generally a fraction of the average wavelength in the observation wavelength range of the illuminating source.

According to one variant, it is also possible to manufacture filters with more than two different materials, each having its own refractive index, without departing from the scope of the present invention.

FIG. 5 shows, in the form of a table, the structure of a weighting filter 9 and indicates, for each of the 98 films that make up the filter 9, the thickness of the film in nm and the material of the film in question.

With these features, a weighting filter 9 that possesses a filtering function $T(\lambda)$ meeting the specifications required for the scattering to be proportional to roughness is obtained. This is shown in FIG. 3 with the curve 108 (circles or thick line), which shows the transmittance T of the weighting filter 9 in the table of FIG. 5 as a function of wavelength $\lambda$.

It may be seen that, in the observation range, which is in the present case comprised between 400 nm and 900 nm, a very good concordance between the curve 106 representing the theoretical transmission curve as explained above and the curve 108 is obtained.

As already detailed above, the weighting filter 9 will need to be recalculated in the general case, depending on calibration features of the system (spectral power of the source, spectral response of the detector, etc.) and for a given spectral window. In any case, stacks of thin films allow the sought-after filter to be produced.

To characterize the surface of a sample, the processing unit 11 for example comprises a computer with a processor and memories, and is programmed to extract the roughness δ of the surface of the sample δ using the following formula:

$$\delta^2 = [\nu(\theta_0)/\eta\Delta\Omega][2\pi(n_0 \sin \theta_0)^2] \qquad (eq. 2)$$

where
- $\theta_0$ is the angle of the detection direction,
- $n_0$ is the optical refractive index of the medium in which the measurement is carried out (in general air, so $n_0 \approx 1$),
- $\Delta\Omega$ is the measurement solid angle of the detection,
- $\eta$ is the constant of proportionality precedingly associated with the weighting filter, and
- $\nu(\theta_0)$ is the scattering signal (surface scattering) delivered in the direction $\theta_0$ when the sample is illuminated with a source of white light.

It will therefore be understood that the roughness δ of the sample 3 may be analysed via a single measurement (i.e. without a spatial or spectral scan) without loss of precision. It will therefore be understood that the characterizing device according to the invention allows a substantial amount of time to be saved while delivering reliable and precise measurement results.

To characterize a volume of a sample 3, the processing unit 11 for example comprises a computer with a processor and memories, and is programmed to extract the volume nonuniformity (Δn/n) of the sample using the following formula:

$$(\Delta n/n)^2 = (1/4)[\nu(\theta_0)/\eta\Delta\Omega][2\pi(n_0 \sin \theta_0)^2] \qquad (eq. 3)$$

where
- $\theta_0$ is the angle of the detection direction,
- $n_0$ is the optical refractive index of the medium in which the measurement is carried out (in general air, so $n_0 \approx 1$),
- $\Delta\Omega$ is the measurement solid angle of the detection,
- $\eta$ is the constant of proportionality precedingly associated with the weighting filter, and
- $\nu(\theta_0)$ is the scattering signal (volume scattering) delivered in the direction $\theta_0$ when the sample is illuminated with a source of white light.

It will therefore be understood that the volume nonuniformity (Δn/n) of the sample 3 may be analyzed via a single measurement (i.e. without a spatial or spectral scan) without loss of precision. It will therefore be understood that the characterizing device according to the invention allows a substantial amount of time to be saved while delivering reliable and precise measurement results.

The difference between equations 2 and 3 (eq. 2 and eq. 3) resides in the fact that the spectral weighting filter 9 must be adapted to the studied scattering case, as already mentioned and explained.

Equations 2 and 3 (eq. 2 and eq. 3) may be derived in the following way:

1) Surface Case (Surface Roughness)

Electromagnetic perturbation theories state that the monochromatic intensity scattered in one direction of space may be written, in the plane of incidence ($\phi=0°$) as follows:

$$I(i_0,\theta_0,\lambda)=C(i_0,\theta_0,\lambda)\gamma(\theta_0,\lambda) \quad (i)$$

This relationship (i) is given for non-polarized light, for reasons of simplicity of the description. $i_0$ and $\theta_0$ are the directions of illumination and of scatter, and $\lambda$ is wavelength. The light source 5 is therefore here deemed to emit at a single wavelength.

In the case of polarized light, the formulae are very similar with a slightly modified coefficient C.

Let us now consider the case where a light source 5 with a broad wavelength spectrum, i.e. a so-called white light source, having an emission spectrum that is continuous in an observation wavelength range of at least 50 nm width is used to illuminate said sample 3, with a spectral power density given by $F(\lambda)$.

With an illumination produced by this light source 5, the scattering signal v measured in a direction $\theta_0$ is an integral over all of the wavelengths, i.e.:

$$v(\theta_0)=\Delta\Omega\int_\lambda C(i_0,\theta_0,\lambda)\gamma(\theta_0,\lambda)F(\lambda)K(\lambda)d\lambda \quad (ii)$$

where $\Delta\Omega$ is the measurement solid angle, $K(\lambda)$ is the spectral response of the detector, and $C(i_0,\theta_0,\lambda)$ is an optical coefficient given by surface perturbation theory.

It will be noted that the coefficient $C(i_0,\theta_0,\lambda)$ does not depend on surface roughness, but only on the conditions of illumination and of observation, and on the refractive indices of the media (ref: Claude Amra, C. Grèzes-Besset, and L. Bruel, "Comparison of surface and bulk scattering in optical multilayers", Appl. Opt. 32, 5492-5503 (1993)). It will be noted here that if a weighting filter $T(\lambda)$ is inserted upstream of the detector or after the source, the signal given by (ii) becomes:

$$v(\theta_0)=\Delta\Omega\int_\lambda C(i_0,\theta_0,\lambda)\gamma(\theta_0,\lambda)F(\lambda)K(\lambda)T(\lambda)d\lambda \quad (iii)$$

At this stage, it is desired that the measured signal be proportional to the roughness $\delta$ of the sample 3, which is given by:

$$\delta^2=(1/\Sigma)\int_{x,y}h^2(x,y)dx\,dy \quad (iv)$$

where h(x,y) describes the topography of the surface to be measured, and $\Sigma$ the illuminated or explored area. Furthermore, in the Fourier plane this roughness may be written:

$$\delta^2=\int_v\gamma(v)dv=\int_{v,\phi}\gamma(v,\phi)v\,dv\,d\phi=2\pi\int_v v\gamma^*(v)dv \quad (v)$$

where:
$\gamma(v)=(1/\Sigma)|\hat{h}(v)|^2$ (vi) is the roughness spectrum of the surface
$\hat{h}(v)$ is the Fourier transform of the surface
$v=(v_x,v_y)=v(\cos\phi,\sin\phi)$ (vii) is the conjugate spatial frequency in (x,y)
$v=|v|$ is the modulus of the spatial frequency
$\gamma^*(v)=(1/2\pi)\int_\phi\gamma(v,\phi)d\phi$ (viii) is the azimuth or polar average of the roughness spectrum
$\phi$ is the direction of the spatial frequency in the $(v_x,v_y)$ plane.

It is also known that the modulus of the spatial frequency is related to the normal scattering angle $\theta_0$ by:

$$v=n_0\sin\theta_0/\lambda \quad (ix)$$

It is now necessary to compare formulae (iii) and (v). To do this, a change of variable is first made in equation (v), using equation (ix) with $\lambda$ as the new variable in the integral. The following is thus obtained:

$$\delta^2=2\pi(n_0\sin\theta_0)^2\int_\lambda\gamma(\theta_0,\lambda)d\lambda/\lambda^3 \quad (x)$$

By comparing the integral of equation (x) to the integral of equation (iii), it may be seen that these integrals are identical if the weighting filter respects:

$$C(\theta_0,\lambda)F(\lambda)K(\lambda)T(\lambda)=\eta/\lambda^3 \quad (xi)$$

where $\eta$ is a constant of proportionality. Therefore:

$$T(\lambda)=\eta/[\lambda^3 C(\theta_0,\lambda)F(\lambda)K(\lambda)] \quad (xii)$$

Thus, with such a spectral weighting filter 9, the signal measured under white light in a given direction is proportional to the roughness of the surface, which is therefore easily measured after suitable calibration.

The fact of modifying the angle of incidence or of illumination does not modify the method, but simply moves the measuring passband, i.e. the resolution with which the roughness is measured; it is therefore a degree of freedom that is an additional advantage and that allows, where appropriate, resolution to be adjusted.

It will however be noted that this is true only for an isotropic surface, for which the spectrum is independent of polar angle, namely when:

$$\gamma^*(v)=\gamma(v)=\gamma(v) \quad (xiii)$$

If the surface is not isotropic, it is enough, for illumination of normal incidence and under non-polarized light, to iterate the scattering measurement while making the sample rotate about its normal, and to then average the measurements. This works because the Fourier transform preserves rotations. In other words, making the sample rotate about its normal also makes the spatial frequency of the same angle rotate.

2) Volume Case (Volume Nonuniformity)

The method is analogous in the volume case, the differences being:

a) A coefficient $D(i_0,\theta_0,\lambda)$ (denoted $C(i_0,\theta_0,\lambda)$ for the surface case above) which is given by perturbation theories of scattering by nonuniform volumes [ref: Claude Amra, C. Grèzes-Besset, and L. Bruel, "Comparison of surface and bulk scattering in optical multilayers", Appl. Opt. 32, 5492-5503 (1993)]. It will be noted here that the random variations in the index of the volume must be uniquely transverse (in x, y), and that the depth variation (along z) of the index may be exponential.

b) A permittivity spectrum that must replace the roughness spectrum. This amounts to replacing the Fourier transform of the profile of the surface (case for roughness) with the Fourier transform of the normalized variations $p(x,y)=\Delta\varepsilon/\varepsilon$ in the permittivity $\varepsilon$ in the volume. The normalized standard deviation of the nonuniformity is then given by:

$$\langle|\Delta n/n|^2\rangle=(1/4)\int_v\gamma(v)dv \quad (xiv)$$

with the permittivity spectrum:

$$\gamma(v)=(1/\Sigma)|\hat{p}(v)|^2 \quad (xv)$$

The optical characterizing device 1 according to the invention is noteworthy for the rapidity of the measurements, its compactness and its simplicity. Specifically, this optical characterizing device functions via a single measurement in a single direction of illumination or of scatter. No scan, neither in wavelength nor spatial or angular is required.

The device 1 for characterizing a sample 3 may function in the following way:

In a step 200, the sample 3 is illuminated with the source 5 of parallel or collimated light having a continuous emission spectrum in an observation wavelength range of at least 50 nm width.

Next, in step 202, light scattered by the sample 3 is detected. A spectral weighting filter 9 having the features described above (see eq. 1) is placed on the optical path upstream of the detector 7 of scattered light.

In a step 204, a parameter characterizing the sample 3 is extracted.

In the presence of a spectral weighting filter 9 configured for surface scattering, the roughness δ of the surface of the sample 3 is extracted using equation 2 (eq. 2).

In the presence of a spectral weighting filter 9 configured for volume scattering, a normalized standard deviation of the nonuniformity (Δn/n) of the volume of the sample is extracted using equation 3 (eq. 3).

The invention claimed is:

1. An apparatus comprising an optical device for characterizing a sample, said optical device comprising a source, a detector, a filter, and a unit, wherein said source is a source of parallel or collimated light for illuminating said sample, wherein said source has a continuous emission spectrum in an observation wavelength range that has a width of at least fifty nanometers, wherein said detector is a detector of light scattered by said sample, wherein said detector functions in said observation wavelength range, wherein said filter is a spectral weighting filter that is placed on an optical path upstream of said detector, and wherein said unit is configured for processing a measurement signal to extract a parameter that characterizes said sample, wherein said filter has, within said observation wavelength range, in reflection or transmission, a spectral filtering function $T(\lambda)$ given by $\eta/[\lambda^3 \Psi(i_0,\theta_0,\lambda)F(\lambda)K(\lambda)]$, wherein $\eta$ is a constant of proportionality, wherein $\lambda$ is wavelength, wherein $\theta_0$ is a direction in which said light is scattered, wherein $i_0$ is an angle of incidence at which said source illuminates said sample, wherein $F(\lambda)$ is a spectral power density of said source in said observation wavelength range, wherein $K(\lambda)$ is a spectral response of said detector in the observation wavelength range, wherein $\Psi(i_0,\theta_0,\lambda)=C(i_0,\theta_0,\lambda)$ in case of characterization of a surface of said sample and $\Psi(i_0,\theta_0,\lambda)=D(i_0,\theta_0,\lambda)$ in case of characterization of a volume of said sample, wherein $C(i_0,\theta_0,\lambda)$ is an optical coefficient given by perturbation theories of light scattering by a rough surface, and wherein $D(i_0,\theta_0,\lambda)$ is an optical coefficient this time given by perturbation theories of light scattering by non-uniform volumes.

2. The apparatus of claim 1, wherein said source is selected from the group consisting of an incandescent lamp, a white-light laser, a white-light diode, and a non-filtered supercontinuum laser.

3. The apparatus of claim 1, wherein said detector comprises a sensor selected from the group consisting of a CCD sensor and a CMOS sensor.

4. The apparatus of claim 1, wherein said filter is between said sample and said detector.

5. The apparatus of claim 1, wherein said filter is between said source and said sample.

6. The apparatus of claim 1, wherein said filter comprises a stack of thin films.

7. The apparatus of claim 6, wherein said stack is a stack that has been deposited in the manner in which semiconductor films or thin optical films are deposited.

8. The apparatus of claim 6, wherein said stack comprises a first material having a first refractive index and a second material having a second refractive index, wherein said second refractive index differs from said first refractive index, and wherein said first and second materials form alternate films in said stack.

9. The apparatus of claim 8, wherein said first and second refractive indices differ by at least 0.4.

10. The apparatus of claim 8, wherein said films are less than 350 nanometers thick.

11. The apparatus of claim 8, wherein said films are between 20 and 325 nanometers thick.

12. The apparatus of claim 8, wherein said first material is silicon dioxide and wherein said second material is tantalum pentoxide.

13. The apparatus of claim 1, wherein said filter is configured for surface scattering, wherein said processing unit is programmed to extract a roughness d of said surface using a formula given by $\delta^2=[v(\theta_0)/\eta\Delta\Omega][2\pi(n_0 \sin \theta_0)^2]$, wherein $\theta_0$ is an angle of detection direction, wherein $n_0$ is an optical refractive index of a medium in which said measurement is carried out, wherein $\Delta\Omega$ is a measurement solid angle of detection, wherein $\eta$ is a constant of proportionality associated with said filter, and wherein $v(\theta_0)$ is a signal delivered by a detector of scatter in a direction $\theta_0$ when said source illuminates said sample.

14. The apparatus of claim 1, wherein said filter is configured for volume scattering, wherein said processing unit is programmed to extract a normalized standard deviation of a nonuniformity of a volume of said sample ($\Delta n/n$) using a formula given by $(\Delta n/n)^2=(1/4)[v(\theta_0)/\eta\Delta\Omega][2\pi(n_0 \sin \theta_0)^2]$, wherein $\theta_0$ is an angle of detection direction, wherein $n_0$ is the optical refractive index of the medium in which said measurement is carried out, wherein $\Delta\Omega$ is a measurement solid angle of detection, wherein $\eta$ is a constant of proportionality, and wherein $v(\theta_0)$ is a signal delivered by said detector in said angle of detection direction $\theta_0$ when said source illuminates said sample.

15. A method comprising characterizing a sample, wherein characterizing said sample comprises illuminating said sample with a source, detecting light scattered by said sample, and extracting a parameter characterizing said sample, wherein said source is a source of parallel or collimated light having a continuous emission spectrum in an observation wavelength range of at least fifty nanometers in width, wherein detecting said light comprises placing a filter on an optical path upstream of a detector of scattered light, wherein said filter is a spectral weighting filter that has, in said observation wavelength range, in reflection or transmission, a spectral filtering function $T(\lambda)$ given by $T(\lambda)=\eta/[\lambda^3 \Psi(i_0,\theta_0,\lambda)F(\lambda)K(\lambda)]$, wherein $\eta$ is a constant of proportionality, wherein $\lambda$ is wavelength, wherein $\theta_0$ is a direction of scattered light, wherein $i_0$ is an angle of incidence at which source illuminates said sample, wherein $F(\lambda)$ is a spectral power density of said source in said observation wavelength range, wherein $K(\lambda)$ is a spectral response of said detector in said observation wavelength range, wherein $\Psi(i_0,\theta_0,\lambda)=C(i_0,\theta_0,\lambda)$ in case of characterization of a surface of said sample and $\Psi(i_0,\theta_0,\lambda)=D(i_0,\theta_0,\lambda)$ in case of characterization of a volume of said sample, wherein $C(i_0,\theta_0,\lambda)$ is an optical coefficient given by perturbation theories of the scatter of light by a rough surface, and wherein $D(i_0,\theta_0,\lambda)$ is an optical coefficient time given by perturbation theories of scatter by nonuniform volumes.

16. The method of claim 15, wherein said filter is configured for surface scattering, wherein said parameter is a roughness of said surface of said sample, and wherein extracting said parameter comprises extracting said parameter using a formula given by $\delta^2=[v(\theta_0)/\eta\Delta\Omega][2\pi(n_0 \sin \theta_0)^2]$, wherein $\theta_0$ is an angle of detection direction, $n_0$ is an optical refractive index of a medium in which said measurement is carried out, $\Delta\Omega$ is a measurement solid angle of said detection, $\eta$ is a constant of proportionality associated with said filter, and $v(\theta_0)$ is a signal delivered by said detector in a direction $\theta_0$ when said source illuminates said sample.

17. The method of claim 15, further comprising configuring said filter for volume scattering, wherein extracting comprises extracting a normalized standard deviation of a nonuniformity ($\Delta n/n$) of a volume of said sample using a formula given by $(\Delta n/n)^2=(1/4)[v(\theta_0)/\eta\Delta\Omega][2\pi(n_0 \sin \theta_0)^2]$, wherein $\theta_0$ is an angle of detection direction, $n_0$ is an optical refractive index of a medium in which said measurement is carried out, wherein $\Delta\Omega$ is a measurement solid angle of detection, wherein $\eta$ is a constant of proportionality associated with said filter, and wherein $v(\theta_0)$, is a signal delivered by said detector of scatter in said direction $\theta_0$ when said source illuminates said sample.

* * * * *